Patented May 21, 1929.

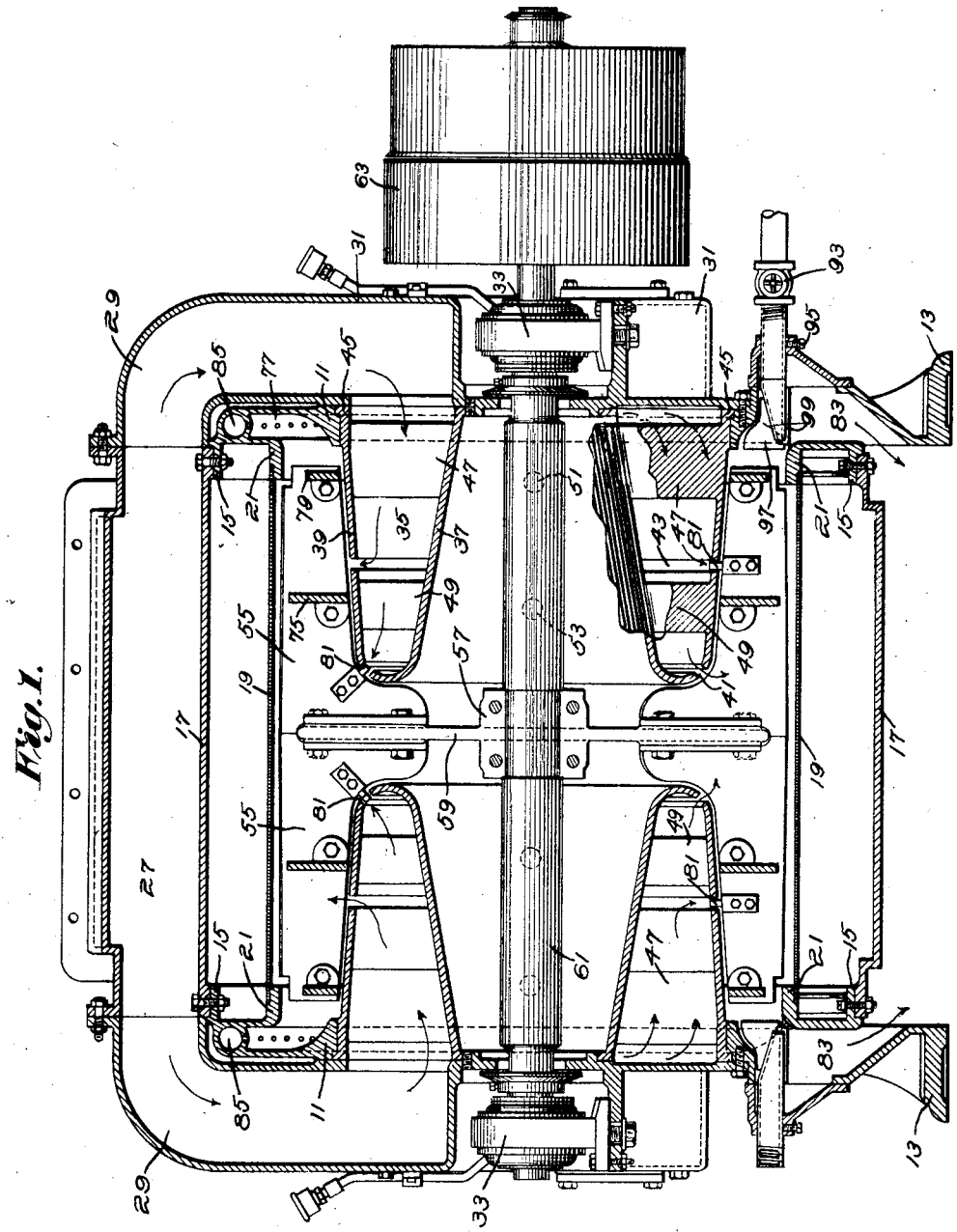

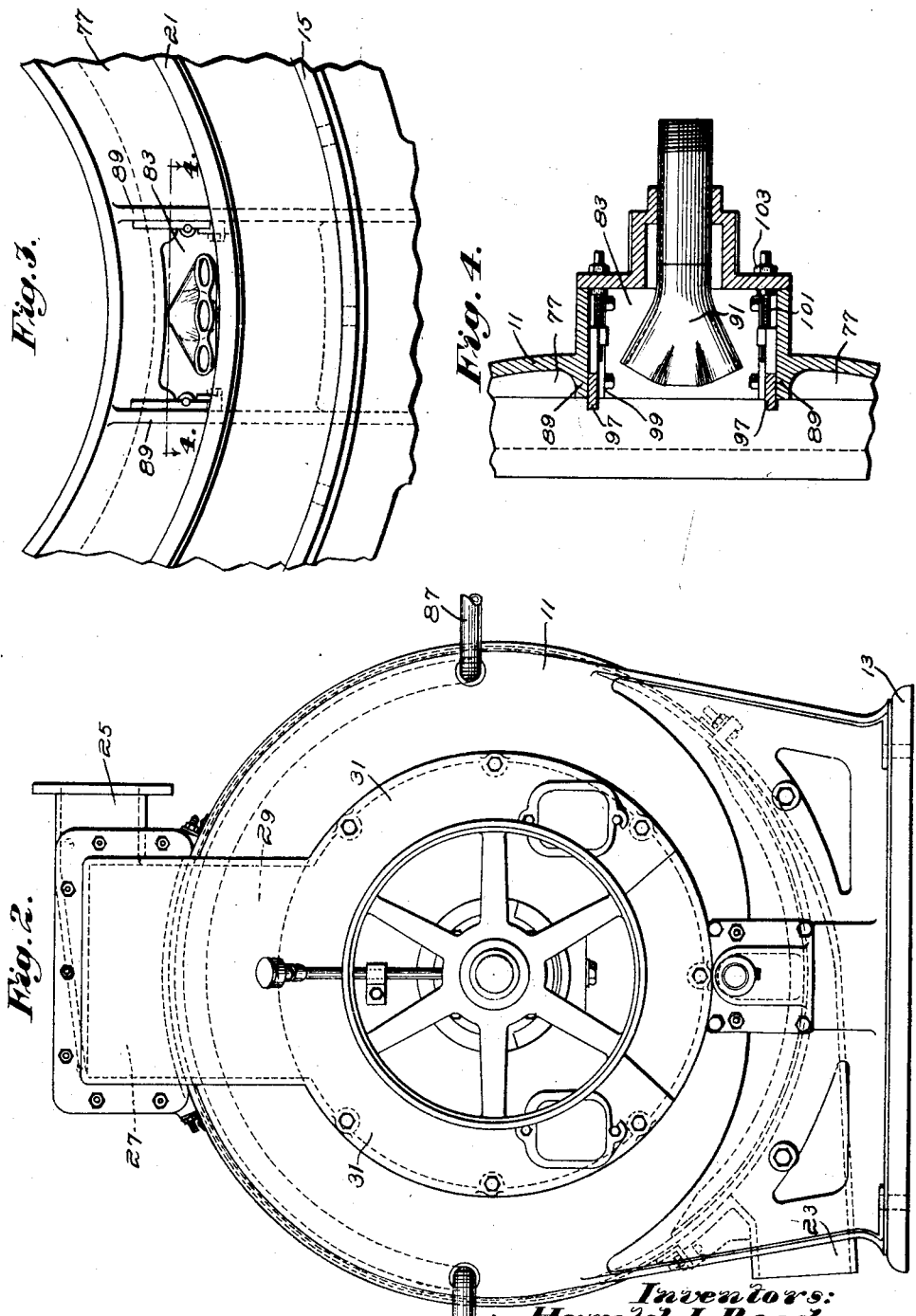

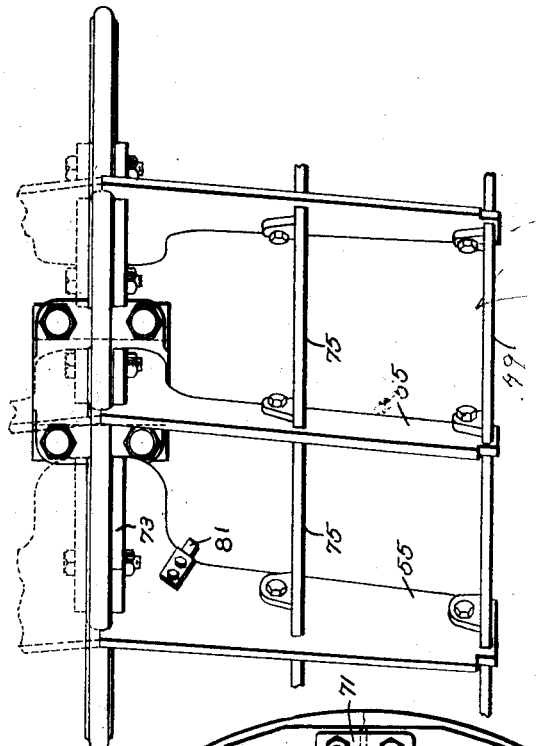
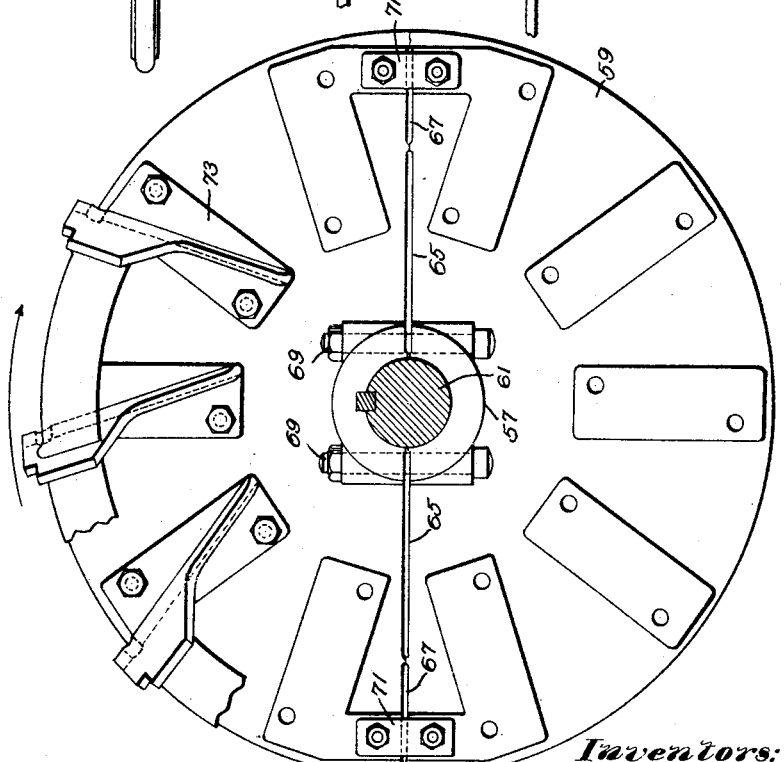

1,714,047

UNITED STATES PATENT OFFICE.

HAROLD J. REED, OF NASHUA, NEW HAMPSHIRE, AND CLAUDE L. SPAFFORD, OF SHERBROOKE, QUEBEC, CANADA, ASSIGNORS TO IMPROVED PAPER MACHINERY COMPANY, OF NASHUA, NEW HAMPSHIRE, A CORPORATION OF MAINE.

SCREEN.

Application filed March 31, 1925. Serial No. 19,609.

This invention relates to screens and more particularly, though not exclusively, to screens intended for screening pulp in paper manufacture where the diluted stock is fed to a screen drum, usually the interior thereof, and there acted on by movable devices, such, for example, as impelling blades, the finer fibres being thereby passed through the meshes of the screen, while the coarser particles or tailings are discharged from the edge thereof. A specifically different method of controlling the escape of the tailings is shown in our Patent No. 1,639,273, dated Aug. 16, 1927.

The invention will be best understood by reference to the following description when taken in connection with the accompanying illustration of one specific embodiment thereof, while its scope will be more particularly pointed out in the appended claims.

In the drawings,—

Fig. 1 is an elevation, principally in central longitudinal section, showing the principal working parts of a screen embodying one form of the invention;

Fig. 2 is an end elevation of the screen shown in Fig. 1;

Fig. 3 is a detail on an enlarged scale showing in side elevation the tailings outlet at one end of the screen and looking from the interior of the screen;

Fig. 4 is a plan in section taken on the line 4—4 in Fig. 3;

Fig. 5 is an elevation of the impeller hub shown secured to the impeller shaft and with several of the impeller blades fastened in position; and Fig. 6 is a plan view of the parts shown in Fig. 5.

Referring to the drawings and to the embodiment of the invention which is there disclosed for illustrative purposes, the screen comprises opposite end members or casings 11 having feet 13 on which the screen is supported. The end members have inturned flanges 15 to which is secured an outer casing 17 which is provided with detachable or sectional portions which may be removed for purposes of inspection or repair of the screen drum and other interior parts.

Within the outer casing 17 there is provided the perforated or foraminous screen plate 19 in the form of a drum of any suitable or usual construction, secured at its ends to the inwardly projecting flanges 21 on the end members. The space within the screen drum constitutes the screening chamber, to which the diluted stock is fed. The annular space between the drum and the outer casing constitutes the screened-stock chamber, the latter having the outlet 23 (Fig. 2) through which the finer screened stock is discharged after having passed through the screen and into the screened-stock chamber.

The diluted stock is fed to the apparatus from any desired source of supply, and under a head sufficient to maintain a steady supply to the screening chamber, through the supply conduit 25 to the stock supply compartment 27 located on top of the outer casing 17, and is thence carried into the opposite ends of the screening chamber through branched supply conduits 29 which turn downwardly at the outside of each opposite end casing 11.

The stock supply passages, the tailings discharge passages, and the impelling devices on opposite sides of the central plane of the screen are of substantially similar construction and the parts on one side only of the screen need be described in detail.

Referring to Figs. 1 and 2, the stock at each end of the screen enters the downwardly directed feed conduit 29 and divides and passes to opposite sides of an annular feed drum 31, one of which sides extends around each end of the machine encircling the bearings 33 except for a short space beneath the bearings. The feed drum opens into an annular feedspout space 35 which is formed between the fixed inner annular spout member 37 and the fixed outer annular spout member 39, whence the stock is discharged radially and symmetrically outward into the screening chamber through appropriate discharge orifices.

The discharge orifices may have any desired form and arrangement, but herein they are shown in the form of annular slots located in the outer annular spout member 39 and comprise the annular feed slot 41 arranged to discharge the stock near the center or mid-portion of the screening chamber and a second annular slot 43 arranged to discharge stock at a point intermediate the mid-portion and the end of the screening chamber. Additional orifices may be provided if desired, the purpose being to arrange the distribution of the annular slots or other orifices and make them of such size that unscreened stock is freely delivered not only to the center but to all parts of the screening chamber, and the entire screening chamber is kept filled with unscreened stock which is replaced with additional stock as fast as it passes through the screening operation. Through this distribution of the supply orifices, the screen for its entire length is working on fresh unscreened stock rendering all portions thereof effective, whereas, with a supply localized near the center of the screen only, the outer portions of the screen are left relatively ineffective.

To assist in maintaining the screening chamber filled with unscreened stock, the free flow of the stock to the screening chamber is facilitated by providing a progressively increased cross sectional area in the feed passages through which the stock passes from the time it is delivered from the supply conduit 25 until it enters the annular feed spout chamber 35, and by providing feed orifices 41 and 43 of sufficient size so as to provide a free and gentle flow of the stock to the screening chamber as contrasted with a restricted flow under an increased velocity at the expense of the head which would be the case if the passages were progressively reduced in cross sectional area.

It is further facilitated by the provision of the downwardly extending supply conduits 29 and downwardly extending branches of the drum 31 which assist in bringing the stock into the annular feed spout chamber directly from a downwardly extended conduit without loss of momentum and utilizing the head and gravitational flow of the stock which would be checked were the stock, for example, to be carried into the feed spout chamber through horizontal feed passages. In the described form of screen the stock enters the annular feed spout chamber directly from the feed drum and passages 29 without substantial loss of momentum or head.

The annular feed spout may be constructed in any desired manner, but herein the outer and the inner members 39 and 37 are cast in a single piece and provided with a flange 45 by which it is clamped in the end casing 11 between the latter and the partly annular feed drum 31. The inner part 37 is connected to the outer part 39 on opposite sides of the slot 43 by two sets of diametrically opposite, narrow fins or ribs 47 and 49 (one set being shown in partial cross section in Fig. 1) and at points separated approximately ninety degrees therefrom by pairs of connecting members in the form of spokes or arms 51 and 53 (indicated in Fig. 1 in dotted lines), these occupying but a trifle of the space within the annular, feed-spout chamber and offering substantially no interference to the free flow of pulp therethrough.

The stock which enters the screening chamber through the longitudinally distributed feed orifices is acted upon by impeller blades 55 which assist in advancing it progressively over the screen 19 and carrying it forwardly and outwardly thereagainst under a continued pressure.

Referring to the specific construction of the impeller shown in connection with the described form of screen, the same comprises a central hub 57 carrying the disk-like spider 59 rotating within the space provided between the two opposite annular feed-spout chambers, the impeller blades 55 being secured to opposite sides of the spider. The latter is mounted to rotate on and with a central drive shaft 61 mounted in the bearings 33 and driven from any suitable source of power, herein, by way of illustration, through the pulley 63.

Referring more particularly to Figs. 5 and 6, the spider 59 may be conveniently cast in a single piece with the hub 57 and provided with diametrically arranged slots, such as indicated by the spaces 65 and 67, so as to provide structurally weakened portions lying along an approximate diameter, the two halves of the spider being connected only by the metal intermediate and at the ends of the slots. After the spider has been machined to receive its equipment, such as the impeller blades 55 and clamp screws 69, it is fractured into two parts along the line of the slots and, after the assemblage of the blades, is then clamped on the drive shaft 61 by means of the split hub which is thereby provided, the peripheral edges of the spider being held together by the clamping plates 71 overlapping the two halves and bolted thereto.

The impeller blades 55, of which there may be any suitable or desired number, are clamped to opposite faces of the spider by means of end flanges 73, the blades having a slight inclination backwardly and outwardly with reference to the direction of rotation, which latter is indicated by the arrow in Fig. 5. The entire blade is preferably thus inclined,—the broad portion near the end flange 73 as well as the narrower portion toward the ends. The blades in Fig. 6 are shown in full lines only at one side of the spider, but it will be understood (as indicated by dotted lines) that they extend longitudinally in opposite directions, each pair in substantial registration, and also that they are inclined longitudinally from the center outwardly and to the rear with respect to the direction of rotation of the blades, this double inclination providing the impeller with a capacity to work the slivers and coarser particles constituting the tailings gradually from the center of the screen to opposite ends thereof, as well as to carry the stock progressively forwardly and outwardly with relation to the screen drum under a continued pressure.

Preferably, as will appear from Fig. 1, the blades conform to the contour of the screening chamber, extending for the full length of the screening drum and preferably slightly beyond. Preferably also the clearance between the outer edges of the blade and the screen plate and the inner edges of the blade and the annular feed spout member 39 is relatively small being reduced to the lowest point consistent with the practical operation of the screen, the result being that the blades virtually separate the stock filling the screening chamber into distinct flowing masses or bodies, each body of stock being moved progressively over the screen between the blades on either side thereof.

Preferably also the outwardly impelling angle of the blades is so selected with reference to the speed of rotation of the impeller that the stock is carried between the blades and pressed forwardly and outwardly under a continued pressure, but without violently hurling the stock against the screen,—an action which has been characteristic of prior screens of the centrifugal type where the stock has been fed to the screening chamber in relatively restricted quantities and there subjected to a violent centrifugal action by the impeller which acts to throw the stock forcibly against the interior of the screen drum. In the described form of screen, the stock is so freely fed to the screening chamber that the latter is maintained substantially filled with unscreened stock in a state of liquid suspension and is there carried around between the inclined blades in separated masses and moved over the screen surface under a continued pressure.

This action may be accentuated, if desired, by further separating the masses of stock longitudinally of the screen through the use of partitions or separating walls 75, which we have herein shown arranged between each adjacent pair of blades and which tend to further separate the unscreened stock fed from the annular feed orifice 43 from that fed through the annular feed orifice 41.

The number of these partition walls between adjacent blades may be increased if desired and they may extend the entire radial width of the blade, but preferably, as shown, they terminate short of the outer edges of the blades to provide working space for the travel of the tailings toward the edges of the screen drum.

The stock at opposite ends of the impeller may be further prevented from too free a discharge to the tailings compartment 77 formed in the end casing by means of outer partition walls 79 extending between the impeller blades near their outer ends, there being, however, sufficient clearance left to allow the tailings gradually to work to the outside.

One or more sets of the blades 55 may be provided with clearing devices in the form of small narrow plates or strips 81 protruding from the blades, which plates enter the feed slots 41 and 43 and, rotating with the blades, maintain the slots open and free from obstruction. Preferably the clearing devices are relatively small so that they reduce in no substantial degree the effective area of the discharge slots.

In the screening action the stock enters the screening chamber through the adequately large feed passages and under a sufficient head to maintain the screening chamber substantially filled with the stock in a state of liquid suspension. The unscreened stock is not only fed to the interior of the chamber near the mid-portion thereof through the feed slots 41 at either side of the spider 59 and between the same and the separating partitions 75, but also through the feed slots 43 to the portions of the screening chamber further removed from the center and between the partitions 75 and 79, so that a steady feed of the unscreened stock is maintained to distributed points of the screening chamber. The rotation of the impellers carries the stock around and forward in separate masses or streams, pressing the same outwardly and forcing the finer particles through the screen, which latter pass down through the screened stock chamber and out through the outlet 23. The coarser particles or tailings are gradually worked to the outer edges of the screen drum owing to the longitudinal inclination of the impellers, where they are finally discharged into the tailings space 77 and there incapable of passing through the screen are ultimately discharged through a tailings discharge passage 83 arranged in the bottom of each end casing.

The tailings, when they reach the tailings space 77, are showered and thinned by water jets which may be located in any suitable position and over any desired area, but are herein delivered from a water chamber 85 which is formed in and extends around the upper half of the end casing 11, being connected to suitable water supply pipes 87 (see Fig. 2).

The tailings which pass through the end of the screen drum and into the tailings space 77 are not only thinned by the shower pipe 85, but are preferably acted upon in such a way that they tend to be worked back into the screening chamber, so that the tailings ejected from the screening chamber are repeatedly rethinned and rescreened, eleminating from the final rejects all but the coarser tailings. Since this action forces back the tailings into the screening chamber it also assists in maintaining the screening chamber filled with a liquid mass and the stock in a state of liquid suspension.

The tailings which enter the upper half of the tailings space 77 are thinned by the water sprayed from the shower pipe 85 and, falling down at either side, tend to drop back into the screening chamber over the top half of the machine due to the concaved deflecting walls of the tailings space. The tailings which pass down at opposite sides to the bottom of the tailings space are prevented from entering directly into the tailings outlet 83 (see Figs. 3 and 4), but are deflected away therefrom and back toward the screening chamber by partition walls 89 which obstruct the passage from the tailings space 77 to the tailings exit 83. These partition walls constitute deflecting plates and the latter might be located elsewhere in the periphery and more than two of them might be provided if desired.

Located within the tailings outlet there is provided a water nozzle provided with any desired number of orifices, but herein three in number, to force diverging sprays of water against the natural flow of the tailings laterally from the screening chamber to the tailings outlet. The three sprays from the nozzle are so arranged that, while the center one is directed in line with the axis of the machine, each other one is inclined so that it tends to strike the tailings descending from each side at such an angle as to drive them back into the screening chamber.

The escaping tailings are therefore again thinned by the water spray from the nozzle 91 and finally escape through the tailings outlet round about the water nozzle. The effect of the water nozzle in checking the escape of the tailings and in exercising its thinning function may be varied not only by means of the valve 93 (Fig. 1) controlling the supply of water to the nozzle, but the nozzle itself is preferably adjustable lengthwise the axis of the screen so that it may be projected inwardly to a greater or less distance over the tailings outlet. For this purpose it is adapted to be held in any selected position of adjustment by means of a set screw 95 engaging a slot or key-way in the bottom of the nozzle.

The escape of the tailings and the rescreening action thereon may be further regulated by means of one or more adjustable baffle plates adapted to restrict more or less the escape of the tailings at the sides of the nozzle 91 and adapted to affect more or less the escaping flow of such tailings, which flow is induced either by the rotary action of the impelling blades or by the natural path of travel of the tailings from the upper part of the tailings space down and about the sides thereof.

Such baffle plate may be of any desired construction, but herein we have shown two such plates 97 of similar construction, each mounted to slide in a guide plate 99 secured to the side of the baffle plate or partition 89 and adapted to be controlled by the adjusting screw 101 and the lock nut 103. This permits either plate to be set in any desired position of adjustment, overlapping more or less the baffle plate or partition 89 and acting to increase more or less the deflecting action of the baffle plates as may be desired in working with different grades of stock or under different conditions of operation.

The screening operation in the described form of screen is effectively carried out through the free supply and distribution of the stock in the screening chamber which, combined with the shape of the impeller blades and their relation to the screening chamber, maintains the screening chamber filled with unscreened stock which is advanced progressively over the screen in separated flowing masses while pressed outwardly under a continued pressure.

The repeated rethinning and rescreening of the tailings, due to the tendency to force them back into the screening chamber, not only carry the screening operation to a highly effective stage but also assist in building up or maintaining the stock in a state of liquid suspension within the screening chamber.

These factors separately and collectively serve to render the screening operation particularly effective and the entire length of the screen active or useful so that, as compared with prior centrifugal screens, the screen may be operated with a reduced expenditure of power and an increased output. It is also possible effectively to handle stock relatively thicker than that heretofore capable of being screened effectively in screens of this type, so that a substantial saving may be had in the power required for pumping and conveying the excess water involved in the thinner stock.

While we have herein shown and described one specific embodiment of the invention, it will be understood that extensive deviations may be made from the illustrated form and that the same may be embodied in various mechanical alternatives and that other applications of the principles of the invention may be made, all without departing from the spirit thereof.

Claims:

1. In a machine of the character described, the combination with a casing of a horizontally positioned screen drum located therein, a screened-stock outlet in communication with the interior of the casing, a tailings outlet communicating with each opposite end of the interior of the drum, feeding spouts projecting from each opposite end of the interior of the drum and comprising each interior and exterior annular spout members to provide between them an annular feed space, said feed spaces having each a plurality of annular discharge orifices distributed between the mid portion and the end of the drum for discharging the stock radially and symmetrically into the interior of the drum and including an annular orifice near the end of the spout for delivering the stock near the mid portion of the drum and a second orifice for delivering stock to a portion of the drum intermediate its mid portion and its end, impeller means occupying the space between the feed spouts and the screen drum comprising a plurality of impeller blades inclined with relation to the length of the drum to cause the feeding of the coarser particles toward the sliver outlet, means for rotating the impeller blades, and means for feeding stock to said feed spouts.

2. In a machine of the character described, the combination with a casing, of a horizontally positioned screen drum located therein, a feed conduit projecting from the end of the casing into the interior of the drum, said conduit having a plurality of discharge orifices comprising slots extending for a substantial distance over the periphery of the conduit for discharging the stock radially and without substantial interruption throughout the interior of the drum, said orifices being common to the same stock space within the conduit and including a slot for delivering the stock at the end of the conduit and a second slot for delivering stock through an intermediate portion of the conduit, rotary impeller blades in close fitting relation to the delivery orifices of the conduit, and means for rotating the impeller blades.

3. In a machine of the character described, the combination with a casing of a screen drum located therein, a feed conduit projecting from the end of the casing into the interior of the drum, said conduit having a plurality of annular discharge orifices for discharging the stock radially and symmetrically into the interior of the drum common to the same stock space within the conduit and including an orifice near the end of the conduit and a second orifice intermediate the end of the conduit and the end of the drum, impeller means between the feed conduit and the screen, and means for feeding stock to said feed conduit.

4. In a machine of the character described, the combination with a casing of a screen drum, feed spouts projecting from each opposite end of the interior of the drum and containing each a feed conduit, said conduits having each a plurality of orifices distributed lengthwise the spout common to the same stock space within the conduit and comprising slots extending over the periphery of the conduit for a substantial distance to provide for a free passage of the stock and for discharging the same into the interior of the drum and distributing the same lengthwise the drum, and impeller means between the feed spouts and the drum.

5. In a machine of the character described, the combination with a casing, of a screen drum therein, stock feeding means extending within the drum from each opposite end of the casing to the interior of the drum and comprising a conduit having orifices for discharging stock at a plurality of points at each side of the mid portion of the drum and common to the same stock space within the conduit and comprising a plurality of slots extending over the periphery of the conduit for a substantial distance, and impeller means between the stock feeding means and the drum.

6. In a machine of the character described, the combination with a casing of a screen drum therein, stock feeding means within the drum comprising a conduit having orifices extending around the periphery of the conduit for discharging the stock radially and without substantial interruption throughout the interior of the drum at a plurality of points distributed lengthwise the same, said orifices being common to the same stock space within the conduit, and impeller means between said stock feeding means and the drum.

7. In a machine of the character described, the combination with a casing, of a screen drum, rotary impeller means within the drum comprising blades provided with partition walls extending circumferentially between succesive blades and tending to separate the stock between adjacent blades into separate batches lengthwise the same, and means for feeding stock to the interior of the drum separately on each side of said partitions.

8. In a machine of the character described, the combination with a casing, of a screen drum, a feed spout projecting from the end of the casing into the interior of the drum, said spout having a plurality of orifices located at different points lengthwise the same, and impeller means within the drum comprising blades located between the feed spout and the drum, with partition walls extending circumferentially between successive blades and located between the discharge from different feed orifices of said feed spout.

9. A screen having a casing, a screen drum, and impeller means, the latter comprising blades inclined outwardly and rearwardly with reference to the direction of rotation and also inclined toward the end from an intermediate position in a direction away from the direction of rotation thereof to feed the unscreened particles toward the outer ends of the drum, and partition walls connecting successive blades located in the active portion of the impeller and between the ends of the screen drum.

10. A screen having a casing, a screen drum, and impeller means, the latter comprising blades inclined outwardly and rearwardly with reference to the direction of rotation and also inclined toward their ends from an intermediate position in a direction away from the direction of rotation thereof to feed the unscreened particles toward the outer ends of the drum, and a plurality of partition walls connecting successive blades located in the active portion of the impeller and between the ends of the screen drum.

11. A rotary impeller for a screen comprising a driving shaft, a spider to opposite sides of which a plurality of impeller blades are secured, said spider being split along an approximate diameter and having two parts secured together and clamped to the driving shaft.

12. The method of forming an impeller for a screen drum which consists in making a supporting disk with structurally weakened portions along an approximate diameter, finishing the face of the disk to receive the necessary impeller blades, fracturing the disk along the weakened area to separate the same into two portions, clamping the two halves to the driving shaft, and assembling the blades.

13. In a machine of the class described, the combination with a casing of a screen drum containing a screening chamber, impelling means within the chamber, a tailings space extending circumferentially around the casing beyond the edges of the drum and having a tailings outlet communicating therewith at the bottom thereof, the walls of the casing being shaped to deflect downwardly gravitating tailings toward the screening chamber, means for showering the tailings in the upper part of the tailings space, an adjustable deflecting plate at each side of the tailings outlet to deflect the tailings toward the screening chamber, and means for discharging a diverging spray of water against the tailings escaping at the tailings outlet to force the same toward the screening chamber, the same comprising a water nozzle located in the outlet and adjustable toward or away from the screening chamber.

14. In a machine of the class described, the combination with a casing of a screen drum having a screening chamber, impelling means within the chamber, a tailings space extending circumferentially around the casing beyond the edges of the drum and having a tailings outlet, and means for showering the tailings in the upper part of the tailings space.

15. In a machine of the class described, the combination with a casing of a screen drum having a screening chamber, rotary impelling means within the chamber, a tailings space beyond the path of the impelling means and having a tailings outlet communicating therewith, and a deflecting wall at the side of the outlet to deflect the tailings back toward the screening chamber.

16. In a machine of the class described, the combination with a casing of a screen drum having a screening chamber, rotary impelling means within the chamber, a tailings space beyond the path of the impelling means and having a tailings outlet communicating therewith, and a deflecting wall at the side of the outlet to deflect the tailings back toward the screening chamber, said wall being adjustable toward or away from the screening chamber.

17. In a machine of the class described, the combination with a casing of a screen drum, impelling means within the drum, a tailings space extending circumferentially around the casing beyond the edges of the drum and having a tailings outlet near the bottom thereof, and a deflecting wall on each side of the tailings outlet to deflect the tailings toward the interior of the drum.

18. In a machine of the class described, the combination with a casing of a screen drum having a screening chamber, impelling means, a tailings space having a tailings outlet, and means for discharging water oppositely against the tailings escaping at the tailings outlet to force the same toward the screening chamber, comprising a water nozzle located in the outlet and adjustable toward or away from the chamber.

19. A casing for a screen drum with a screening chamber, impelling means, a tailings space having a tailings outlet, a deflecting wall on each side of the tailings outlet, and means for discharging water oppositely against the tailings escaping from the tailings space at the tailings outlet to force the same back toward the screening chamber.

20. A screen having a screen drum and an impeller, a tailings outlet, and means for discharging water in a diverging spray at the mouth of the tailings outlet opposite to and against the tailings escaping at the tailings outlet to force the same back toward the screening chamber.

21. The method of screening fibre stock which consists in feeding diluted stock and distributing it to a screening chamber against a cylindrical screen, maintaining the stock in liquid suspension in contact with the screen and substantially filling the spaces of the screening chamber, and there acting on it with blades or paddles and advancing it progressively over the screen in separated flowing masses between the blades or paddles by moving the latter over the screen surface to carry the stock forwardly and outwardly under continued pressure.

22. In a machine of the class described, the combination with a casing, of a screen drum having a screening chamber, impelling means, a tailings outlet, means for discharging water against the mouth of the tailings outlet and oppositely against the tailings escaping therefrom and obstructing walls about the tailings outlet to compel the escape of the tailings against said water discharge.

23. A machine of the class described, having a casing, a screen drum, a screening chamber, impelling means, a tailings space within the casing beyond the path of the impelling means, said space having a tailings outlet, obstructing wall adjacent the mouth of the tailings outlet to deflect the tailings therefrom toward the screening chamber and means for discharging water oppositely against the tailings escaping through the tailings outlet to force the same toward the screening chamber.

24. In a machine of the class described, the combination with a casing, of a screen drum containing a screening chamber, rotary impelling blades within the chamber, and a tailings space extending circumferentially around the casing beyond the path of the impelling blades and having a tailings outlet communicating therewith at the bottom thereof, and obstructing walls between the tailings outlet and the tailings space to deflect downwardly gravitating tailings on both opposite sides back toward the screening chamber.

In testimony whereof, we have signed our names to this specification.

HAROLD J. REED.
CLAUDE L. SPAFFORD.